United States Patent
Yu et al.

(10) Patent No.: US 7,756,889 B2
(45) Date of Patent: Jul. 13, 2010

(54) PARTITIONING OF NESTED TABLES

(75) Inventors: Qin Yu, Belmont, CA (US); Geeta Arora, Union City, CA (US); Sriram Krishnamurthy, San Francisco, CA (US); Adiel Yoaz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 226 days.

(21) Appl. No.: 11/707,735

(22) Filed: Feb. 16, 2007

(65) Prior Publication Data

US 2008/0201296 A1    Aug. 21, 2008

(51) Int. Cl.
G06F 7/00 (2006.01)
(52) U.S. Cl. ..................... 707/774; 707/778
(58) Field of Classification Search ............... 707/2
See application file for complete search history.

(56) References Cited

U.S. PATENT DOCUMENTS

| | | | |
|---|---|---|---|
| 5,222,234 A | 6/1993 | Wang et al. | |
| 6,003,036 A | 12/1999 | Martin | |
| 6,014,656 A | 1/2000 | Hallmark et al. | |
| 6,341,289 B1 | 1/2002 | Burroughs et al. | |
| 6,438,562 B1 | 8/2002 | Gupta et al. | |
| 6,587,854 B1 | 7/2003 | Guthrie et al. | |
| 6,665,684 B2 | 12/2003 | Zait et al. | |
| 6,816,853 B1 | 11/2004 | Agarwal et al. | |
| 6,842,753 B2 | 1/2005 | Chaudhuri et al. | |
| 6,931,390 B1 | 8/2005 | Zait et al. | |
| 6,957,225 B1 | 10/2005 | Zait et al. | |
| 6,965,891 B1 | 11/2005 | Jakobsson et al. | |
| 7,020,656 B1 | 3/2006 | Gong | |
| 7,020,661 B1 | 3/2006 | Cruanes et al. | |
| 7,370,049 B2 * | 5/2008 | Doole et al. | 707/8 |
| 2001/0047372 A1 * | 11/2001 | Gorelik et al. | 707/514 |
| 2002/0169788 A1 * | 11/2002 | Lee et al. | 707/104.1 |
| 2002/0194196 A1 * | 12/2002 | Weinberg et al. | 707/104.1 |
| 2003/0028551 A1 * | 2/2003 | Sutherland | 707/200 |
| 2006/0047622 A1 | 3/2006 | Folkert et al. | |
| 2006/0253429 A1 | 11/2006 | Raghavan et al. | |

(Continued)

OTHER PUBLICATIONS

Eric Paapanen. "Oracle Database Application Developer's Guide—Large Objects", 10g Release 1(10.1), Part No. B10796-01, Dec. 2003.*

(Continued)

*Primary Examiner*—Apu M Mofiz
*Assistant Examiner*—Cindy Nguyen
(74) *Attorney, Agent, or Firm*—Hickman Palermo Truong & Becker LLP; Daniel D. Ledesma

(57) ABSTRACT

Techniques for partitioning nested tables are provided. A parent table includes a column for collection items. A nested table is created for storing items that belong to the collection items. The nested table is partitioned to create a plurality of nested table partitions. Each nested table partition is a distinct, separately stored structure within a database. How the nested table is partitioned may, or may not, be based on how the parent table is partitioned. For example, a nested table may be partitioned based on the same criteria in which the parent table is partitioned. As another example, a nested table may be partitioned, whereas the parent table is not partitioned.

32 Claims, 4 Drawing Sheets

Parent Table 100

| DEPT_ID | DEPT_NAME | COUNTRY | EMP_INFO |
|---|---|---|---|
| 121 | Customer Service | India | A |
| 122 | Manufacturing | China | B |
| 123 | Marketing | USA | C |
| 124 | R&D | France | D |
| 122 | Manufacturing | Chile | E |

Nested Table 110

| SET_ID | EMP_ID | EMP_NAME | EMP_ADDRESS | EMP_START_DATE |
|---|---|---|---|---|
| B | 324 | Q. Yu | 12 Aries Lane | 12/04 |
| C | 452 | M. Jones | 23 Taurus Circle | 03/06 |
| A | 873 | S. Krishnamurthy | 34 Gemini Drive | 02/05 |
| D | 237 | J. Chirac | 45 Leo Place | 08/06 |
| A | 543 | N. Agarwal | 56 Virgo Street | 03/04 |
| B | 569 | B. Li | 67 Libra Avenue | 11/05 |
| E | 401 | J. Mendez | 78 Sagittarius Blvd | 07/06 |
| ... | ... | ... | ... | ... |
| C | 705 | D. Grimes | 89 Pisces Road | 02/05 |

U.S. PATENT DOCUMENTS

2008/0086470 A1* 4/2008 Graefe .......................... 707/8

OTHER PUBLICATIONS

"Oracle Database administrator's Guide", 10g Release 1(10.1), Part No. B10739-01, Dec. 2003—chapter 16 "managing Partitioned Tables and Indexes".*

"Design Considerations for Collections" retrieved from the Internet Feb. 16, 2007 <http://oracle-docs.dartmouth.edu/dba-docs/10gdoc/appdev.101/b10799/abodjdes.htm > pp. 9-19 (11 pages).

"16 Managing Partitioned Tables and Indexes" retrieved from the Internet Feb. 16, 2007 <http://oracle-docs.dartmouth.edu/dba-docs/10gdoc/server.101/b10739/partiti.htm > pp. 1-25.

Oracle Corp., "Parallelism and Partitioning," Oracle8*i*Data Warehousing Guide, Release 2 (8.1.6), chapter 5, retrieved from the Internet at < http://download-uk.oracle.com/cd/A87860_01/doc/server.817/a76994/parpart.htm >, retrieved on Nov. 4, 2005, 16 pages.

Sybase, Transact-SQL Guide, Adaptive Server Enterprise 15.0, Oct. 2005, pp. 363-371.

* cited by examiner

Parent Table 100

| DEPT_ID | DEPT_NAME | COUNTRY | EMP_INFO |
|---|---|---|---|
| 121 | Customer Service | India | A |
| 122 | Manufacturing | China | B |
| 123 | Marketing | USA | C |
| 124 | R&D | France | D |
| 122 | Manufacturing | Chile | E |

Nested Table 110

| SET_ID | EMP_ID | EMP_NAME | EMP_ADDRESS | EMP_START_DATE |
|---|---|---|---|---|
| B | 324 | Q. Yu | 12 Aries Lane | 12/04 |
| C | 452 | M. Jones | 23 Taurus Circle | 03/06 |
| A | 873 | S. Krishnamurthy | 34 Gemini Drive | 02/05 |
| D | 237 | J. Chirac | 45 Leo Place | 08/06 |
| A | 543 | N. Agarwal | 56 Virgo Street | 03/04 |
| B | 569 | B. Li | 67 Libra Avenue | 11/05 |
| E | 401 | J. Mendez | 78 Sagittarius Blvd | 07/06 |
| ... | ... | ... | ... | ... |
| C | 705 | D. Grimes | 89 Pisces Road | 02/05 |

Partition 301

| DEPT_ID | DEPT_NAME | COUNTRY | EMP_INFO |
|---|---|---|---|
| 121 | Customer Service | India | A |

Partition 302

| DEPT_ID | DEPT_NAME | COUNTRY | EMP_INFO |
|---|---|---|---|
| 122 | Manufacturing | China | B |
| 122 | Manufacturing | Chile | E |

Partition 303

| DEPT_ID | DEPT_NAME | COUNTRY | EMP_INFO |
|---|---|---|---|
| 123 | Marketing | USA | C |

Partition 304

| DEPT_ID | DEPT_NAME | COUNTRY | EMP_INFO |
|---|---|---|---|
| 124 | R&D | France | D |

Parent Table Partitions
- - - - - - - - - - - Non-Equi-Partitioning - - - - - - - - - - -
Nested Table Partitions Partition 311

| SET_ID | EMP_ID | EMP_NAME | EMP_ADDRESS | EMP_START_DATE |
|---|---|---|---|---|
| A | 543 | N. Agarwal | 56 Virgo Street | 03/04 |
| B | 324 | Q. Yu | 12 Aries Lane | 12/04 |

Partition 312

| SET_ID | EMP_ID | EMP_NAME | EMP_ADDRESS | EMP_START_DATE |
|---|---|---|---|---|
| A | 873 | S. Krishnamurthy | 34 Gemini Drive | 02/05 |
| C | 705 | D. Grimes | 87 Pisces Road | 02/05 |
| B | 569 | B. Li | 67 Libra Avenue | 11/05 |

Partition 313

| SET_ID | EMP_ID | EMP_NAME | EMP_ADDRESS | EMP_START_DATE |
|---|---|---|---|---|
| C | 452 | M. Jones | 23 Taurus Circle | 03/06 |
| E | 401 | J. Mendez | 78 Sagittarius Blvd | 07/06 |
| D | 237 | J. Chirac | 45 Leo Place | 08/06 |

PARTITIONING OF NESTED TABLES

FIELD OF THE INVENTION

This application is related to partitioning nested tables and to various techniques that may be employed to partition nested tables.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Partitions

When a relational database has very large tables, with potentially millions of rows, it is desirable to divide the tables into subtables ("partitions") of a more manageable size. The operation of dividing a table into partitions is typically accomplished with a partitioning key. A partitioning key is a key that is used to determine to which partition a particular record (row) belongs. The partitioning key can be defined in terms of one or more attributes (columns) of the table. The several partitions produced by this process are collectively referred to as the partitioned table. Each partition of the partitioned table has the same columns as the partitioned table. However, each partition contains only a subset of the rows of the partitioned table.

Benefits of Partitioning Database Objects

Partitioning a table has a positive effect on query processing. By using information regarding the partitioning scheme of a table, the amount of time required to execute a query that accesses the table may be reduced. Partitioning allows a query to be processed with a partial table scan rather than a full table scan if the query involves a predicate containing the partitioning key. If the query involves the partitioning key, the number of partitions that need to be searched may be reduced prior to executing the query. For example, the query optimizer can generate a query plan that excludes partitions that cannot possibly contain rows that satisfy the user specified conditions.

For example, the following Structured Query Language (SQL) statement creates a table "sales" that is range partitioned based on date values contained in a column named "saledate":

create table sales (saledate DATE, productid NUMBER, ...)
partition by range (saledate)
    partition sa194Q1 values less than to_date (yy-mm-dd, '94-04-01')
    partition sa194Q2 values less than to_date (yy-mm-dd, '94-07-01')
    partition sa194Q3 values less than to_date (yy-mm-dd, '94-10-01')
    partition sa194Q4 values less than to_date (yy-mm-dd, '95-01-01')

Execution of this statement creates a table named "sales" that includes four partitions: sa194Q1, sa194Q2, sa194Q3, and sa194Q4. The partition named sa194Q1 includes all rows that have a date less than 94-04-01 in their saledate column. The partition named sa194Q2 includes all rows that have a date greater than or equal to 94-04-01 but less than 94-07-01 in their saledate column. The partition named sa194Q3 includes all rows that have a date greater than or equal to 94-07-01 but less than 94-10-01 in their saledate column. The partition named sa194Q4 includes all rows that have a date greater than or equal to 94-10-01 but less than 95-01-01 in their saledate column.

When a database server receives a request to perform an operation, the database server makes a plan of how to execute the query. If the operation involves accessing a partitioned object, part of making the plan involves determining which partitions of the partitioned object, if any, can be excluded from the plan (i.e. which partitions need not be accessed to execute the query). The process of excluding partitions from the execution plan of a query that accesses a partitioned object is referred to as "partition pruning".

The database server can perform partition pruning when the statement received by the database server explicitly limits itself to a partition or set of partitions. Thus, the database server can exclude from the execution plan of the statement "select * from sales PARTITION(sa194Q1)" all partitions of the sales table other than the sa194Q1 partition.

The database server can also perform partition pruning on statements that do not explicitly limit themselves to particular partitions, but which select data based on the same criteria that was used to partition the partitioned object. For example, the statement:

select * from sales where saledate between (94-04-01) and (94-06-15)

does not explicitly limit itself to particular partitions. However, because the statement limits itself based on the same criteria (saledate values) that was used to partition the sales table, the database server is able to determine, based on the selection criteria of the statement and the partition definitions of the table, which partitions need not be accessed during execution of the statement. In the present example, the database server would be able to perform partition pruning that limits the execution plan of the statement to sa194Q2.

Nested Tables

A table that logically resides in a column of another table is referred to as a nested table. A table that is associated with a nested table is referred to as the "parent table" of the nested table. From the perspective of the parent table, a nested table is a structure for storing collection items that logically reside in cells of the parent table.

For example, the sales table described above may have a "salesperson" column that logically stores information about the salespeople that were involved in the sale. For example, the row within the sales table that is associated with a particular sale may logically store, within the salesperson column, the name, position, and employee id of each salesperson that participated in a particular sale. However, rather than actually store this collection of salesperson information (which may include any number of rows) in the salesperson column of the row of the sales table, the information is stored in multiple rows of a separate salesperson table. The row in the parent table contains a reference for locating the appropriate rows within the salesperson table.

A problem with nested tables is that, in some instances, nested tables become very large. As a result, when processing a query, even if a parent table is partitioned, a full scan of the nested tables that are associated with the parent table may be required.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a diagram that illustrates an exemplary parent table and an exemplary nested table;

FIG. 3 is a diagram that illustrates an example of non-equi-partitioning of the tables illustrated in FIG. 1, according to an embodiment of the invention;

DETAILED DESCRIPTION

Figure 2:
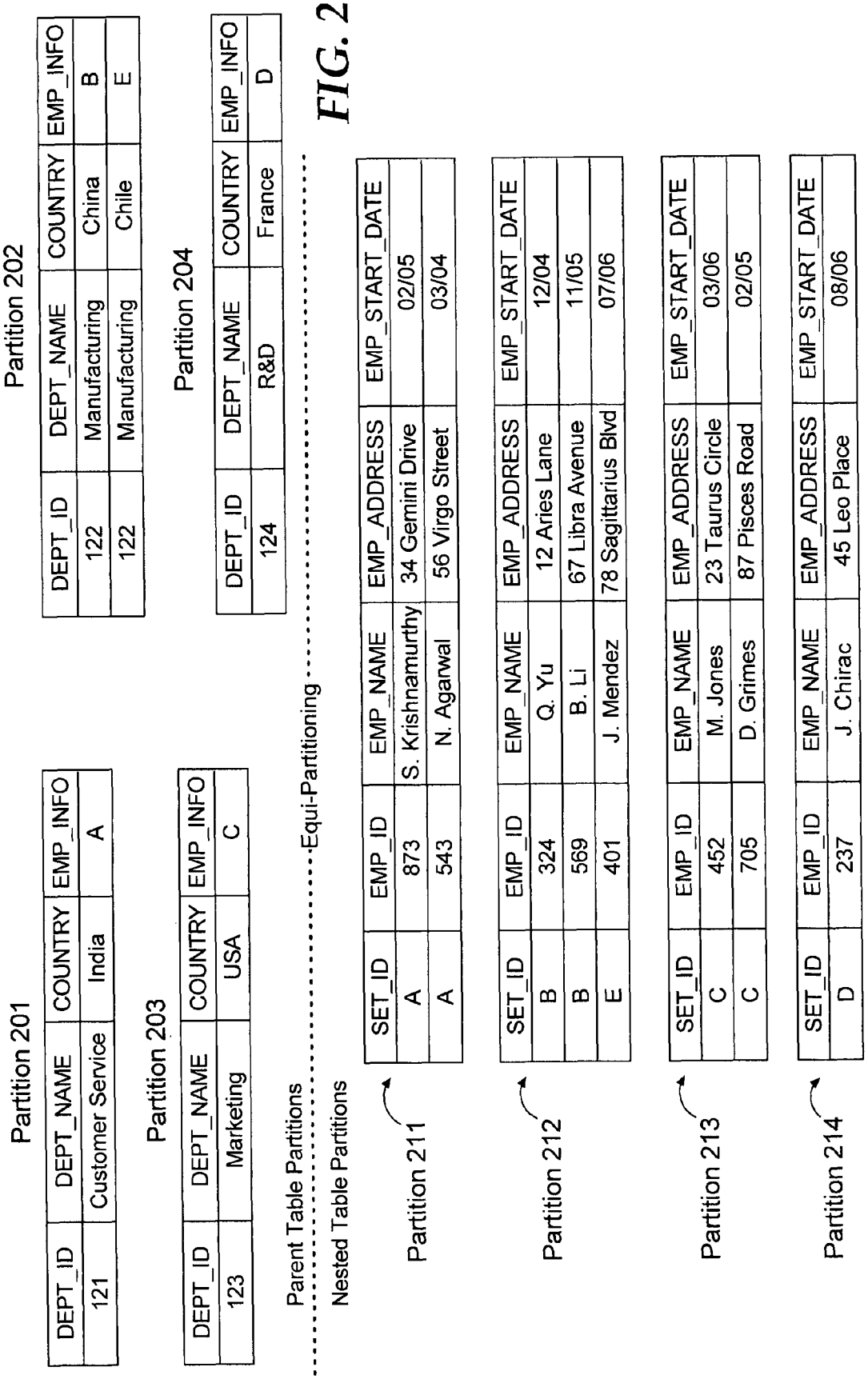
FIG. 2 is a diagram that illustrates an example of equi-partitioning of the tables illustrated in FIG. 1, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A technique for partitioning nested tables is provided. A nested table may be partitioned based on a set of criteria regardless of whether or how the parent table is partitioned. For example, in one embodiment, a nested table is partitioned based on the same criteria that was used to partition the parent table. In another embodiment, a nested table is partitioned based on criteria that is different than the criteria in which the parent table is partitioned. In yet another embodiment, a nested table is partitioned while the parent table remains "un-partitioned".

By partitioning nested tables, the benefits of improved table maintenance and query processing (e.g., partition pruning) may be achieved.

The following disclosure will be described with respect to the example tables illustrated in FIG. 1. However, embodiments of the invention are not limited to the illustrated example. The illustrated example is used for purposes of description and illustration to show how embodiments of the invention may be implemented. For example, parent table 100 of FIG. 1 may be associated with multiple nested tables. As another example, the storage for nested table 110 of FIG. 1 may be a heap table where the collection of items in the heap table is unordered by default. Alternatively, if the collection is ordered, then a nested table is stored as an index-organized table (IOT). Furthermore, the following description gives examples of range and list partitioning; however, any other type of partitioning may be used, such as hash, interval, and composite partitioning.

Exemplary Tables

FIG. 1 is a diagram that illustrates an exemplary parent table 100 and an exemplary nested table 110. Parent table 100 stores information about departments in a particular company, referred to hereinafter as company XYZ. Parent table 100 comprises four columns: Department Identifier (DEPT_ID), Department Name (DEPT_NAME), Country, and Employee Information (EMP_INFO) for employees in the corresponding department.

Nested table 10 stores information about employees of the particular company. Nested table 10 comprises five columns: Set Identifier (SET_ID), Employee Identifier (EMP_ID), Employee Name (EMP_NAME), Employee Address (EMP_ADDRESS), and Employee Start Date (EMP_START_DATE).

The last column in parent table 100 (i.e., EMP_INFO) may be a virtual column that is not allocated any memory in which to store employee information. Rather, the value in the EMP_INFO column is used to map rows from parent table 100 (i.e., the department table) to rows in nested table 110 (i.e., the employee table). For example, in FIG. 1, the row with the value 'A' in the EMP_INFO column of parent table 100 maps to the rows in nested table 110 whose SET_ID column has an 'A' value (i.e., rows with EMP_ID values of 873 and 543).

Partitioning a Nested Table

According to an embodiment of the invention, a nested table is partitioned based on a set of criteria. The set of criteria on which the partitioning of a nested table is based is referred to herein as the "nested partitioning criteria". The nested partitioning criteria may be associated with information stored only in the parent table, information stored only in the nested table, or information stored in both tables. As an example of nested partitioning criteria that is associated with information stored only in the parent table, the set of criteria upon which nested table 110 may be partitioned is DEPT_NAME, or the name of a department. As an example of nested partitioning criteria that is associated with information stored only in the nested table, the set of criteria upon which nested table 110 may be partitioned is year and/or month of the EMP_START_DATE.

There are multiple ways in which a nested table may be partitioned with respect to the parent table, such as equi-partitioning, top-level equi-partitioning, and non-equi-partitioning. Such approaches are described in detail below.

Equi-Partitioning

According to an embodiment, a nested table is partitioned based on the same criteria in which the parent table is partitioned. Such partitioning of the nested table is referred to hereinafter as "equi-partitioning." FIG. 2 illustrates an example of equi-partitioning. Parent table 100 is partitioned based on DEPT_NAME. The result of partitioning parent table 100 based on DEPT_NAME is four parent table (PT) partitions: 201, 202, 203, and 204. PT partitions 201, 203, and 204 each comprise one row, indicating that there is only one of each department in company XYZ. PT partition 202 comprises two rows, indicating that there are multiple Manufacturing departments in company XYZ.

The employees in the nested table are also partitioned based on department. The rows in parent table 100 that correspond to a particular department are examined to determine the value in the EMP_INFO column of the rows. The EMP_INFO value is used to determine a nested table (NT) partition to which a row in nested table 110 belongs. In the illustrated example, since there are employees in each of the four departments, there are four NT partitions: 211, 212, 213, and 214. PT partition 201 corresponds to NT partition 211; PT partition 202 corresponds to NT partition 212; and so forth. In equi-partitioning, there is a one-to-one relationship between the PT partitions and the NT partitions.

Also in equi-partitioning, if the parent table is partitioned at multiple levels, then the nested table is also partitioned similarly. For example, if parent table 100 is partitioned based on Country and then based on DEPT_NAME, then nested table 110 would also be partitioned based on Country and then based on DEPT_NAME.

Top-Level Equi-Partitioning

In one embodiment, a parent table and a nested table are partitioned similarly at least the first level but the nested table is partitioned differently at further levels with respect to the parent table. Such partitioning is referred to hereinafter as "subpartitioning", which is a type of equi-partitioning.

As an example of subpartitioning, parent table 100 and nested table 110 are both partitioned based on DEPT_NAME. Nested table 110 may then be further partitioned based on EMP_START_DATE, whereas parent table 100 is not further partitioned. In this example of subpartitioning, there exists a one-to-many relationship between the PT partitions and the NT partitions.

As another example of subpartitioning, parent table 100 and nested table 110 are both first partitioned based on DEPT_NAME. Parent table 100 is then further partitioned based on Country, whereas nested table 110 is not further partitioned. In this example of subpartitioning, there exists a many-to-one relationship between the PT partitions and the NT partitions.

As another example of subpartitioning, parent table 100 and nested table 110 are both partitioned based on DEPT_NAME. Nested table 10 is then further partitioned based on EMP_START_DATE, whereas parent table 100 is further partitioned based on different criteria, such as Country. In this example of subpartitioning, there may exist a many-to-many relationship between the PT partitions and the NT partitions.

Non-Equi-Partitioning

According to an embodiment, a nested table is partitioned differently than the parent table at least at the first level. Such partitioning is referred to hereinafter as "non-equi-partitioning."

As an example of non-equi-partitioning, parent table 100 is not partitioned at all, whereas nested table 10 is partitioned based on EMP_START_DATE.

FIG. 3 illustrates another example of non-equi-partitioning. Parent table 100 is partitions based on DEPT_NAME and nested table 10 is partitioned based on the EMP_START_DATE. The result of partitioning parent table 100 based on DEPT_NAME produces PT partitions 301, 302, 303, and 304. The result of partitioning nested table 110 based on the year component of EMP_START_DATE produces NT partitions 311, 312, and 313. In this latter example of non-equi-partitioning, there usually exists a many-to-many relationship between the PT partitions and the NT partitions. In FIG. 3, each of PT partitions 301, 302, and 303 correspond to multiple NT partitions. Furthermore, each of NT partitions 311, 312, and 313 correspond to multiple PT partitions.

Even when a query is executed against a parent table and nested table that is non-equi-partitioned, query performance may be significantly improved. If the query specifies at least two sets of criteria—one of which is used to partition the parent table and the other is used to partition the nested table—then, depending on the data sought, partitions from the parent table and from the nested table may be pruned. For example, if the query requested a database server to return a list of countries of all employees who work in Manufacturing and who began work at the company before 2005, then PT partitions 301, 303-304, and NT partitions 312-313 may be pruned.

Maintenance Operations

In one embodiment, partition maintenance operations are performed on NT partitions. Such partition maintenance operations may be initiated in response to requests to perform maintenance operations on the corresponding PT partitions. With respect to equi-partitioning and subpartitioning, maintenance operations may be cascaded, i.e., a maintenance operation performed on a PT partition initiates the same maintenance operation to be performed on the corresponding NT partition. With respect to non-equi-partitioning, a maintenance operation must be performed on each (PT or NT) partition separately.

Examples of maintenance operations that may be performed on NT partitions include, but are not limited to, adding a partition, merging partitions, splitting a partition, coalescing partitions, truncating a partition, and dropping a partition. As an example of truncating a partition (referring now to FIG. 2), if all the rows from PT partition 202 were deleted, then all the rows from NT partition 212 would also be deleted.

As an example of splitting a partition, if PT partition 202 were split into two equal-size PT partitions, then NT partition 212 would similarly be split into two equal-sized NT partitions.

As an example of merging partitions, if PT partitions 203 and 204 were merged into one PT partition, then NT partitions 213 and 214 would similarly be merged into one NT partition.

Coalescing partitions only applies to hash partitions. If PT partitions 201-204 and NT partitions 211-214 were partitioned based on a hash function and a coalescing operation was submitted, then the last hash partition for each table would be selected. In this case, PT partition 204 and NT partition 214 would be selected. Then, the contents of each selected hash partition would be distributed into one or more remaining partitions as determined by the hash function. In this case, contents of PT partition 204 would be distributed into PT partitions 201-203 and the contents of NT partition 214 would be distributed into NT partitions 211-213 as determined by the hash function. PT partition 204 and NT partition 214 would then be dropped.

Benefits

Many benefits may be realized when partitioning nested tables. First, maintaining multiple NT partitions is easier than maintaining a single large nested table. An example in improving table maintenance, different NT partitions may be stored in different tablespaces, which assists database administrators (DBAs) in maintaining nested tables. A DBA may temporarily take a single NT partition offline instead of an entire nested table.

Another benefit that may be realized when partitioning nested tables is that the performance of queries that target data stored in NT partitions is greatly improved. For example, parallel DML operations will not suffer appreciably from latch contention since different rows are assigned to different NT partitions. As another example of improved query performance, NT partitions may be "pruned" during execution of a query, avoiding the necessity to perform a full scan of an un-partitioned nested table. Specifically, if (1) a query specifies a set of criteria that the values in rows must satisfy and (2)

the nested table is partitioned based, at least in part, on the set of criteria, then certain NT partitions may be pruned.

Hardware Overview

Figure 4:
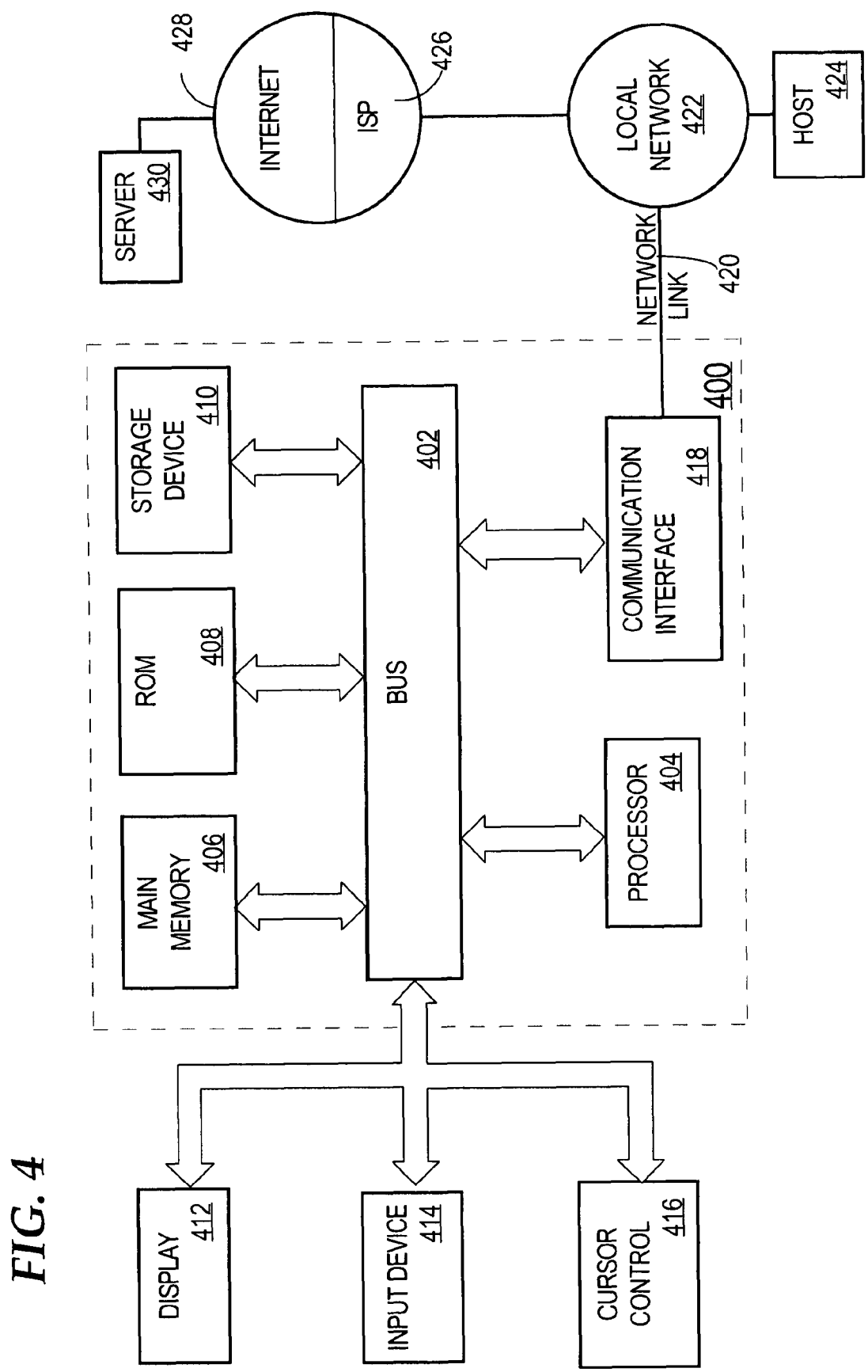
FIG. 4 is a block diagram of a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
creating a parent table that includes a column for storing collection items;
creating a nested table for storing items that belong to said collection items, wherein the nested table logically resides in a column of the parent table, wherein the nested table is distinct and stored separate relative to the parent table; and
partitioning the nested table to create a plurality of nested table partitions;
wherein each partition of the plurality of nested table partitions is a distinct, separately stored structure within a database;
wherein each partition of the plurality of nested table partitions corresponds to a subset of said items that belong to said collection items, wherein said subset is distinct relative to the other subsets stored in the other partitions of the plurality of nested table partitions;
wherein the steps are performed on one or more computing devices.

2. The method of claim 1, wherein:
the parent table is partitioned, and
partitioning the nested table to create a plurality of nested table partitions includes storing, in different nested table partitions, items that belong to collection items that are stored in different partitions of the parent table.

3. The method of claim 1, wherein:
the parent table is partitioned into a plurality of parent table partitions, and
each nested table partition, of the plurality of nested table partitions, corresponds to a different parent table partition of the plurality of parent table partitions and stores items that belong to the collection items that are stored in said different parent table partition.

4. The method of claim 3, wherein there is a one-to-one relationship between the plurality of parent table partitions and the plurality of nested table partitions.

5. The method of claim 3, wherein:
partitioning the nested table includes partitioning the nested table at multiple levels; and
there is a one-to-many relationship between the parent table partitions and the nested table partitions.

6. The method of claim 1, wherein the parent table is not partitioned.

7. The method of claim 1, further comprising:
receiving a request to perform a maintenance operation on the parent table; and
in response to the request, performing:
the maintenance operation on the parent table; and
the maintenance operation on the nested table.

8. The method of claim 7, wherein the maintenance operation is a maintenance operation from the set consisting of: adding a partition, merging multiple partitions, splitting a partition, coalescing partitions, truncating a partition, and dropping a partition.

9. The method of claim 1, further comprising:
storing one nested table partition, of the plurality of nested table partitions, on a first storage device; and
storing another nested table partition, of the plurality of nested table partitions, on a second storage device.

10. The method of claim 1, wherein one or more partitions of the plurality of nested table partitions is stored as an index-organized table.

11. A method for processing queries, the method comprising the steps of:
receiving a query that specifies particular criteria for a search, wherein the query requests data logically contained in a parent table;
wherein the parent table includes a column for storing collection items;
wherein items, for the collection items that are logically stored in the column of the parent table, are stored in a nested table that is divided into a plurality of nested table partitions that are distinct and stored separately relative to the parent table;
while executing said query,
performing a comparison between said particular criteria and partitioning criteria upon which said nested table was partitioned to create said plurality of nested table partitions;
based on the comparison, excluding from said search one or more partitions of said plurality of nested table partitions;
wherein the steps are performed on one or more computing devices.

12. The method of claim 11, wherein:
the parent table is partitioned,
the method further comprises partitioning the nested table to create the plurality of nested table partitions; and
partitioning the nested table includes storing, in different nested table partitions, items that belong to collection items that are stored in different partitions of the parent table.

13. The method of claim 11, wherein:
the parent table is partitioned into a plurality of parent table partitions, and
each nested table partition corresponds to a parent table partition and stores items that belong to the collection items that are stored in the corresponding parent table partition.

14. The method of claim 11, wherein the parent table is not partitioned.

15. The method of claim 1, wherein partitioning the nested table comprises partitioning the nested table based on data from a column of a table other than the nested table.

16. The method of claim 1, wherein partitioning the nested table comprises partitioning the nested table based on data from a column of the nested table.

17. One or more storage media storing instructions which, when executed by one or more processors, cause:
creating a parent table that includes a column for storing collection items;
creating a nested table for storing items that belong to said collection items, wherein the nested table logically resides in a column of the parent table, wherein the nested table is distinct and stored separate relative to the parent table; and partitioning the nested table to create a plurality of nested table partitions;

wherein each partition of the plurality of nested table partitions is a distinct, separately stored structure within a database;

wherein each partition of the plurality of nested table partitions corresponds to a subset of said items that belong to said collection items, wherein said subset is distinct relative to the other subsets stored in the other partitions of the plurality of nested table partitions.

18. The one or more storage media of claim 17, wherein:
the parent table is partitioned, and
partitioning the nested table to create a plurality of nested table partitions includes storing, in different nested table partitions, items that belong to collection items that are stored in different partitions of the parent table.

19. The one or more storage media of claim 17, wherein:
the parent table is partitioned into a plurality of parent table partitions, and
each nested table partition, of the plurality of nested table partitions, corresponds to a different parent table partition of the plurality of parent table partitions and stores items that belong to the collection items that are stored in said different parent table partition.

20. The one or more storage media of claim 19, wherein there is a one-to-one relationship between the plurality of parent table partitions and the plurality of nested table partitions.

21. The one or more storage media of claim 19, wherein:
partitioning the nested table includes partitioning the nested table at multiple levels; and
there is a one-to-many relationship between the parent table partitions and the nested table partitions.

22. The one or more storage media of claim 17, wherein the parent table is not partitioned.

23. The one or more storage media of claim 17, wherein the instructions, when executed by the one or more processors, further cause:
receiving a request to perform a maintenance operation on the parent table; and
in response to the request, performing:
the maintenance operation on the parent table; and
the maintenance operation on the nested table.

24. The one or more storage media of claim 23, wherein the maintenance operation is a maintenance operation from the set consisting of: adding a partition, merging multiple partitions, splitting a partition, coalescing partitions, truncating a partition, and dropping a partition.

25. The one or more storage media of claim 17, wherein the instructions, when executed by the one or more processors, further cause:
storing one nested table partition, of the plurality of nested table partitions, on a first storage device; and
storing another nested table partition, of the plurality of nested table partitions, on a second storage device.

26. The one or more storage media of claim 17, wherein one or more partitions of the plurality of nested table partitions is stored as an index-organized table.

27. The one or more storage media of claim 17, wherein partitioning the nested table comprises partitioning the nested table based on data from a column of a table other than the nested table.

28. The one or more storage media of claim 17, wherein partitioning the nested table comprises partitioning the nested table based on data from a column of the nested table.

29. One or more storage media storing instructions for processing queries, wherein the instructions, when executed by one or more processors, cause:
receiving a query that specifies particular criteria for a search, wherein the query requests data logically contained in a parent table;
wherein the parent table includes a column for storing collection items;
wherein items, for the collection items that are logically stored in the column of the parent table, are stored in a nested table that is divided into a plurality of nested table partitions that are distinct and stored separately relative to the parent table;
while executing said query,
performing a comparison between said particular criteria and partitioning criteria upon which said nested table was partitioned to create said plurality of nested table partitions;
based on the comparison, excluding from said search one or more partitions of said plurality of nested table partitions.

30. The one or more storage media of claim 29, wherein:
the parent table is partitioned,
the method further comprises partitioning the nested table to create the plurality of nested table partitions; and
partitioning the nested table includes storing, in different nested table partitions, items that belong to collection items that are stored in different partitions of the parent table.

31. The one or more storage media of claim 29, wherein:
the parent table is partitioned into a plurality of parent table partitions, and
each nested table partition corresponds to a parent table partition and stores items that belong to the collection items that are stored in the corresponding parent table partition.

32. The one or more storage media of claim 29, wherein the parent table is not partitioned.

* * * * *

UNITED STATES PATENT AND TRADEMARK OFFICE
CERTIFICATE OF CORRECTION

| | | |
|---|---|---|
| PATENT NO. | : 7,756,889 B2 | Page 1 of 1 |
| APPLICATION NO. | : 11/707735 | |
| DATED | : July 13, 2010 | |
| INVENTOR(S) | : Qin Yu et al. | |

It is certified that error appears in the above-identified patent and that said Letters Patent is hereby corrected as shown below:

In column 4, line 4, delete "10" and insert -- 110 --, therefor.

In column 4, line 5, delete "10" and insert -- 110 --, therefor.

In column 5, line 30, delete "10" and insert -- 110 --, therefor.

In column 5, line 43, delete "partritioning," and insert -- partitioning, --, therefor.

In column 5, line 44, delete "10" and insert -- 110 --, therefor.

In column 5, line 48, delete "10" and insert -- 110 --, therefor.

Signed and Sealed this
Nineteenth Day of April, 2011

David J. Kappos
*Director of the United States Patent and Trademark Office*